(12) United States Patent
Seo et al.

(10) Patent No.: US 7,667,896 B2
(45) Date of Patent: *Feb. 23, 2010

(54) DVD RECORDING AND REPRODUCING SYSTEM

(75) Inventors: Cheong Soo Seo, Seongnam (KR); Gyoung Il Cho, Seoul (KR); Sang Hyune Baek, Suwon (KR)

(73) Assignees: Angstrom, Inc., Seongnam (KR); Stereo Display, Inc., Anaheim, CA (US)

( * ) Notice: Subject to any disclaimer, the term of this patent is extended or adjusted under 35 U.S.C. 154(b) by 267 days.

This patent is subject to a terminal disclaimer.

(21) Appl. No.: 11/341,030

(22) Filed: Jan. 28, 2006

(65) Prior Publication Data

US 2006/0171037 A1    Aug. 3, 2006

Related U.S. Application Data (63) Continuation-in-part of application No. 11/191,886, filed on Jul. 28, 2005, now Pat. No. 7,095,548, and a continuation-in-part of application No. 11/076,616, filed on Mar. 10, 2005, now Pat. No. 7,274,517, and a continuation-in-part of application No. 11/072,296, filed on Mar. 4, 2005, now abandoned, and a continuation-in-part of application No. 11/072,597, filed on Mar. 4, 2005, now Pat. No. 7,330,297, and a continuation-in-part of application No. 10/983,353, filed on Nov. 8, 2004, now Pat. No. 7,267,447, and a continuation-in-part of application No. 10/979,568, filed on Nov. 2, 2004, now Pat. No. 7,354,167, and a continuation-in-part of application No. 10/934,133, filed on Sep. 3, 2004, now Pat. No. 7,315,503, and a continuation-in-part of application No. 10/893,039, filed on Jul. 16, 2004, now Pat. No. 7,239,438, and a continuation-in-part of application No. 10/872,241, filed on Jun. 18, 2004, now Pat. No. 7,382,516, and a continuation-in-part of application No. 10/857,714, filed on May 28, 2004, now Pat. No. 7,161,729, and a continuation-in-part of application No. 10/857,280, filed on May 28, 2004, now Pat. No. 6,999,226, and a continuation-in-part of application No. 10/855,715, filed on May 27, 2004, now Pat. No. 7,031,046.

(51) Int. Cl.
G02B 27/10 (2006.01)
(52) U.S. Cl. ...................................... 359/619; 359/626
(58) Field of Classification Search .................. 359/619
See application file for complete search history.

(56) References Cited

U.S. PATENT DOCUMENTS 2,002,376 A    5/1935    Mannheimer (Continued)

FOREIGN PATENT DOCUMENTS

JP    08-043881    2/1996

(Continued)

Primary Examiner—Jordan M. Schwartz
Assistant Examiner—James C Jones (57) ABSTRACT

The objective of the present invention is to provide a high-speed, miniaturized, low-cost DVD recording and reproducing system. The present invention is particularly directed to a motorless optical pick-up device for recording and/or reading information on or from an optical disc (CD or DVD), which provides focusing, tracking, seamless layer jumping, tilt compensation, and CD/DVD compatibility.

14 Claims, 5 Drawing Sheets

U.S. PATENT DOCUMENTS

| | | | |
|---|---|---|---|
| 4,407,567 | A | 10/1983 | Michelet |
| 4,532,619 | A | 7/1985 | Suglyama |
| 4,834,512 | A | 5/1989 | Austin |
| 5,004,319 | A | 4/1991 | Smither |
| 5,212,555 | A | 5/1993 | Stoltz |
| 5,369,433 | A | 11/1994 | Baldwin |
| 5,402,407 | A | 3/1995 | Eguchi |
| 5,467,121 | A | 11/1995 | Allcock |
| 5,612,736 | A | 3/1997 | Vogeley |
| 5,687,154 | A | 11/1997 | Tsuchlya |
| 5,696,619 | A | 12/1997 | Knipe |
| 5,717,674 | A | 2/1998 | Mori |
| 5,748,603 | A | 5/1998 | Kim |
| 5,881,034 | A | 3/1999 | Mano |
| 5,897,195 | A | 4/1999 | Choate |
| 5,986,811 | A | 11/1999 | Wohlstadter |
| 6,025,951 | A | 2/2000 | Swart |
| 6,028,689 | A | 2/2000 | Michaliek |
| 6,064,423 | A | 5/2000 | Geng |
| 6,084,843 | A | 7/2000 | Abe |
| 6,104,425 | A | 8/2000 | Kanno |
| 6,111,900 | A | 8/2000 | Suzudo |
| 6,123,985 | A | 9/2000 | Robinson |
| 6,282,213 | B1 | 8/2001 | Gutin |
| 6,315,423 | B1 | 11/2001 | Yu |
| 6,329,737 | B1 | 12/2001 | Jerman |
| 6,498,673 | B1 | 12/2002 | Frigo |
| 6,507,366 | B1 | 1/2003 | Lee |
| 6,549,730 | B1 | 4/2003 | Hamada |
| 6,625,342 | B2 | 9/2003 | Staple |
| 6,649,852 | B2 | 11/2003 | Chason |
| 6,650,461 | B2 | 11/2003 | Atobe |
| 6,658,208 | B2 | 12/2003 | Watanabe |
| 6,711,319 | B2 | 3/2004 | Hoen |
| 6,741,384 | B1 | 5/2004 | Martin |
| 6,784,771 | B1 | 8/2004 | Fan |
| 6,828,537 | B2 | 12/2004 | Jutte |
| 6,833,938 | B2 | 12/2004 | Nishioka |
| 6,885,819 | B2 | 4/2005 | Shinohara |
| 6,900,901 | B2 | 5/2005 | Harada |
| 6,900,922 | B2 | 5/2005 | Aubuchon |
| 6,906,848 | B2 * | 6/2005 | Aubuchon .................. 359/291 |
| 6,906,849 | B1 | 6/2005 | Mi |
| 6,914,712 | B2 | 7/2005 | Kurosawa |
| 6,919,982 | B2 | 7/2005 | Nimura |
| 6,934,072 | B1 | 8/2005 | Kim |
| 6,934,073 | B1 | 8/2005 | Kim |
| 6,944,103 | B2 | 9/2005 | Hong |
| 6,944,757 | B2 | 9/2005 | Lee |
| 6,958,777 | B1 | 10/2005 | Pine |
| 6,970,284 | B1 | 11/2005 | Kim |
| 6,995,909 | B1 | 2/2006 | Hayashi |
| 6,999,226 | B2 | 2/2006 | Kim |
| 7,023,466 | B2 | 4/2006 | Favalora |
| 7,031,046 | B2 | 4/2006 | Kim |
| 7,068,416 | B2 | 6/2006 | Gim |
| 7,077,523 | B2 | 7/2006 | Seo |
| 7,161,729 | B2 | 1/2007 | Kim |
| 7,274,517 | B2 * | 9/2007 | Cho et al. .................. 359/726 |
| 7,315,503 | B2 * | 1/2008 | Cho et al. ............. 369/112.29 |
| 2002/0018407 | A1 | 2/2002 | Komoto |
| 2002/0102102 | A1 | 8/2002 | Watanabe |
| 2002/0135673 | A1 | 9/2002 | Favalora |
| 2003/0058520 | A1 | 3/2003 | Yu |
| 2003/0071125 | A1 | 4/2003 | Yoo |
| 2003/0174234 | A1 | 9/2003 | Kondo |
| 2003/0184843 | A1 | 10/2003 | Moon |
| 2004/0009683 | A1 | 1/2004 | Hiraoka |
| 2004/0012460 | A1 | 1/2004 | Cho |
| 2004/0021802 | A1 | 2/2004 | Yoshino |
| 2004/0052180 | A1 | 3/2004 | Hong |
| 2004/0246362 | A1 | 12/2004 | Konno |
| 2004/0252958 | A1 | 12/2004 | Abu-Ageel |
| 2005/0024736 | A1 | 2/2005 | Bakin |
| 2005/0057812 | A1 | 3/2005 | Raber |
| 2005/0136663 | A1 | 6/2005 | Gan |
| 2005/0168798 | A1 * | 8/2005 | Mushika et al. ............. 359/295 |
| 2005/0174625 | A1 | 8/2005 | Huiber |
| 2005/0180019 | A1 | 8/2005 | Cho |
| 2005/0212856 | A1 | 9/2005 | Temple |
| 2005/0224695 | A1 | 10/2005 | Mushika |
| 2005/0225884 | A1 | 10/2005 | Gim |
| 2005/0231792 | A1 | 10/2005 | Alain |
| 2005/0264870 | A1 | 12/2005 | Kim |
| 2006/0012766 | A1 | 1/2006 | Klosner |
| 2006/0012852 | A1 | 1/2006 | Cho |
| 2006/0028709 | A1 | 2/2006 | Cho |
| 2006/0187524 | A1 | 8/2006 | Sandstrom |
| 2006/0209439 | A1 * | 9/2006 | Cho et al. .................. 359/851 |

FOREIGN PATENT DOCUMENTS

| | | |
|---|---|---|
| JP | 11-069209 | 3/1999 |
| JP | 2002-288873 | * 10/2002 |

* cited by examiner

DVD RECORDING AND REPRODUCING SYSTEM

REFERENCES TO RELATED APPLICATIONS

This application is a continuation-in-part of, and claims priority to U.S. patent application Ser. No. 10/855,715 filed May 27, 2004, U.S. patent application Ser. No. 10/857,714 filed May 28, 2004, U.S. patent application Ser. No. 10/857,280 filed May 28, 2004, U.S. patent application Ser. No. 10/872,241 filed Jun. 18, 2004, U.S. patent application Ser. No. 10/893,039, filed July 16, U.S. patent application Ser. No. 10/934,133 filed Sep. 3, 2004, U.S. patent application Ser. No. 10/979,568 filed Nov. 2, 2004, U.S. patent application Ser. No. 10/983,353 filed Nov. 8, 2004, U.S. patent application Ser. No. 11/072,597 filed Mar. 4, 2005, U.S. patent application Ser. No. 11/072,296 filed Mar. 4, 2005, U.S. patent application Ser. No. 11/076,616 filed Mar. 10, 2005 and U.S. patent application Ser. No. 11/191,886 filed Jul. 28, 2005, all of which are hereby incorporated by reference.

FIELD OF INVENTION

The present invention relates to a DVD recording and reproducing systems with a optical pick-up device comprising at least one Micromirror Array Lens (MMAL) or an array of MMALs and also to a DVD recording and reproducing system with a motorless optical pick-up device comprising an array of MMALs.

BACKGROUND OF INVENTION

DVD is an optical storage medium with large data capacity. A single layer DVD can store about seven times more data than a standard CD while their physical dimensions including diameter and thickness are the same. The data on DVD is recorded in the form of microscopic pits and land along the spiral track, which is similar to CD; however, DVD has much smaller pit size with higher densification possibly on multiple layers. A DVD recording and reproducing system needs to provide a precise mechanism to record and reproduce these microscopic high density data signals. In addition, due to the popularity of CD, it needs to provide CD/DVD compatibility like all commercial DVD players and drives.

A DVD recording and reproducing system includes a spindle motor with a turn table configured to position and rotate an optical disc (DVD or CD), an optical pick-up unit configured to focus in on pits and trace a data track, and a control system for controlling the spindle motor and the optical pick-up unit.

The optical pick-up unit uses an objective lens to focus a laser beam onto the surface of the optical disc to record or reproduce data. Since the DVD has a small pit size with high densification, the laser beam needs to be focused in on small spot. To reduce the spot diameter, the optical pick-up unit for the DVD employs a laser diode with a reduced wavelength and an objective lens with a large numerical aperture.

To read data from an optical disc, the objective lens focuses a laser beam on the surface of the optical disc and a photo detector measures the intensity of the reflected light from the reflective layer of the optical disc. When it hits a pit in the data layer, the reflected light is more diffused, or has a weak intensity. When it strikes a smooth area, or land, the reflected light has a strong intensity. The signal processor identifies pits and land based on the measured light intensity, and converts them to an electrical signal, which is sent to a decoder.

Similarly, to record data on an optical disc, the objective lens focuses the light on the dye layer of the optical disc. The intensity of the laser beam emitted by a laser diode is varied according to a data signal transmitted to the laser via a data storage device. Depending on the intensity of the laser beam, the dye that is used to form the optical disc reacts to the heat and light to create a series of recorded pits and land.

Focusing and tracking errors caused by eccentricities in the rotation of the disk and vibration due to the rotation of the disk are detected by a signal processor using a light beam image formed in a photo detector. When an objective lens is closer to or farther away from an optical disc than the focal length of the objective lens, a signal processor can detect abnormality from a light beam image formed in the photodetector and produce a focus correction signal.

For tracking control, a three spot push-pull radial tracking method (U.S. Pat. No. 4,532,619 and U.S. Pat. No. 6,828,537) is usually employed, which utilizes a diffraction grating wherein the light is converted into a central peak and two side peaks. If the optical head is on track, the central beam is configured to be centered on the data track and two side beams are configured to be centered on land. A photo detector will measure a lower light intensity for a central spot than for side spots because the central beam is tracking on both pits and land while side beams are tracking on land. In addition, two side beams will have the same intensity. If the optical head is deviated from the data track, the central spot will have a higher light intensity and side spots will have lower intensities. Also, the intensities of two side spots will be different. In that case, the signal processor produces a tracking correction signal.

Conventional optical pick-up units are actuated by an electromagnetically driven servo system comprising coils and magnets, which usually provides two-axis controls; one for focusing control which drives the objective lens in the direction perpendicular to the optical disc surface and the other for tracking control which drives the optical head in the radial direction of the optical disc. The servo system includes a moving part that conducts macroscopic translational motions for focusing and tracking, and generates a certain degree of vibration.

The aforementioned conventional optical pick-up units show some limitations and drawbacks mainly due to their slow response time, a lack of degree of freedom, and complexity. Many DVDs use dual layers. The second layer can use either parallel track path layout or an opposite track path layout. The parallel track path layout in which both layers read from the center of the disc is suitable for a computer random access application such as DVD-Rom, a disc providing the choice between wide screen and full screen versions, or a disc having special DVD features along with a movie. The opposite track path layout in which the first layer reads from the inside to the outside while the second layer reads from the outside to the inside allows near continuous playback for long movies with a high picture quality. Both methods usually show noticeable time delay (freezing) for transition and refocusing from one layer to another because conventional optical pick-up devices use the macroscopic servo technologies to actuate controller, which results in a slow response time.

The tilt of an optical disc caused by the deflection and mechanical run-out of a disk, increases coma aberration, which is critical in systems with a large numerical aperture. Thus, tilt compensation is strongly required for DVD recording and reproducing systems. However, it is difficult for a two-axis optical pick-up actuator to compensate for coma aberration. Moreover, there is a sub-resonance problem due to mass unbalance or nonlinearity of the moving parts.

In order to solve those problems, optical pick-up units used in DVD recording and reproducing systems require three-axis motions for focusing, tracking, and tilt compensation. Such a device is described in US Patent No. 2004/0052180 A1, wherein a three-axis macroscopic mechanical servo system is used. However, the three-axis macroscopic actuator has many disadvantages, including, but not limited to, its complicated structure, large volume, heavy weight, low speed, high cost, and vulnerability to vibration.

Moreover, to provide the CD/DVD compatibility, it requires complicated structures such as an additional objective lens (U.S. Pat. No. 5,687,154), a holographic optical element (U.S. Pat. No. 5,717,674), or a liquid crystal shutter (U.S. Pat. No. 5,748,603).

Further, there is a growing need for high-speed, and small and thin size DVD recording and reproducing system. However, it is very difficult to satisfy the requirements for high-speed and/or miniaturization when the conventional servo technology is employed.

Thus, there is a practical need for an optical pick-up unit for DVD recording and reproducing systems that provides focusing, tracking, seamless layer jumping, tilt compensation, and CD/DVD compatibility with minimal macroscopic motion or even without macroscopic motion. This device also must be able to withstand vibration and satisfy the need for high-speed, miniaturization, and low production cost.

SUMMARY OF INVENTION

The objective of the present invention is to provide a high-speed, miniaturized, low-cost DVD recording and reproducing system. The present invention is particularly directed to a motorless optical pick-up device for recording and/or reading information on or from an optical disc (CD or DVD), which provides focusing, tracking, seamless layer jumping, tilt compensation, and CD/DVD compatibility.

In a preferred embodiment of the present invention, the optical pick-up device includes a laser diode, a first optical lens, a beam splitter, a second optical lens, a Micromirror Array Lens (MMAL), an image sensor, a tilt detector, and a signal processor. The laser diode generates a light beam, which is passed through the first optical lens. The first optical lens collimates the light beam, which is then passed to the beam splitter. The light is passed from the beam splitter to the MMAL. The MMAL deflects the light beam substantially 90°, and focuses it on the optical disc. Light reflected from the optical disc is collimated by the MMAL, and deflected back towards the beam splitter. The beam splitter then deflects the reflected light substantially 90°, towards the second optical lens. The second optical lens passes the reflected light and focuses it on the optical sensor. The sensor detects the intensity of the reflected light from the reflective layer of the optical disc, and generates an electrical signal based on the intensity of light it receives. The electrical signal is passed to the signal processor. The tilt detector measures the tilt of the optical disc. The measured tilt is sent to the signal processor. The signal processor generates a reproduction signal. The signal processor also generates control data which is sent to the MMAL to adjust micromirrors to compensate for a focusing error, a tracking error, and a tilt error.

Similarly, optical pick-up devices of the present invention are capable of writing data onto the optical disc. In that regard, the intensity of the laser beam emitted by the laser diode is varied according to a data signal transmitted to the laser diode via a data storage device within the DVD recording and reproducing system. The laser beam is passed through the first optical lens. The first optical lens collimates the laser beam. The beam is then passed to the beam splitter. The laser beam is passed from the beam splitter to the MMAL. The MMAL deflects the laser beam substantially 90°, and focuses it on the dye layer of the optical disc. Depending on the intensity of the laser beam, the dye that is used to form the optical disc reacts to the heat and light to create a series of pits and lands corresponding to the data to be stored.

Optical pick-up devices of the present invention are capable of recording data on and reading data from a multi-layered DVD. In this instance, the MMAL records and/or reads information at each layer of a multi-layered DVD by changing its focal length to focus on the desired disc layer. Unlike conventional servo mechanisms used in the optical pick-up devices, a fast response time of MMAL can facilitate seamless jumping between layers.

When an optical disc is tilted in an optical disc drive, the quality of a recorded signal and/or a reproduced signal of the optical disc may be lowered. In order to correct the tilt of the optical disc, the optical pick-up device may comprise a tilt detector. The tilt detector detects the tilt of the optical disc and generates a tilt signal in response to the detected tilt. This tilt signal is transmitted to the signal processor. The signal processor processes the tilt signal and transmits a control signal to the MMAL to compensate for the tilt error.

Further, optical pick-up devices of the present invention provide CD/DVD compatibility. These optical information recording media have different thicknesses of transparent base boards. In order to obtain the compatibility, it is necessary to correct a spherical aberration generated by the difference of the thickness of the transparent base boards. The spherical aberration can be compensated by controlling the rotations and/or translations of micromirrors.

In other embodiments, the DVD optical pick-up device may comprise a planar array of MMALs with different shapes, sizes, and numbers of micromirrors. In addition to all the optical parameters such as the focal length, the optical axis, the lens size, the number of micromirrors, and others of each MMAL, the total number of lenses comprising the array is variable according to the purpose of the array. Each MMAL may have a different optical axis, a different number of micromirrors, and a different focal length. Since each MMAL can freely change its optical axis and focal length with three-degree-of-freedom motions of its micromirrors, each MMAL causes incident light to focus at any position along the planar surface of the optical disc without a macroscopic servo mechanism for tracking. Therefore, the array of MMALs affords a motorless optical pick-up device, in which various DVD features such as instant rewinding, fast forwarding, searching, skipping, and the like become much faster and more reliable.

The present invention provides an optical pick-up device that can perform focusing, tracking, seamless layer jumping, and/or tilt compensating without macroscopic motions. Thus, an optical pick-up device using a MMAL can be very small, thin, and light.

BRIEF DESCRIPTION OF THE DRAWINGS

These and other features, aspects, and advantages of the present invention will be better understood by reference to the following detailed description when considered in conjunction with the accompanying drawings, wherein.

DETAILED DESCRIPTION OF THE ILLUSTRATED EMBODYMENTS

In a preferred embodiment of the present invention, an optical pick-up device is provided for use in a DVD recording and reproducing system. The optical pick-up device comprises at least one variable focal length Micromirror Array Lens (MMAL) or an array of MMALs. The MMAL records and/or reads information on and/or from an optical disc. The present invention provides focusing, tracking, seamless layer jumping, and tilt compensating of the optical pick-up with minimal macroscopic motion or without macroscopic motion.

Figure 1:
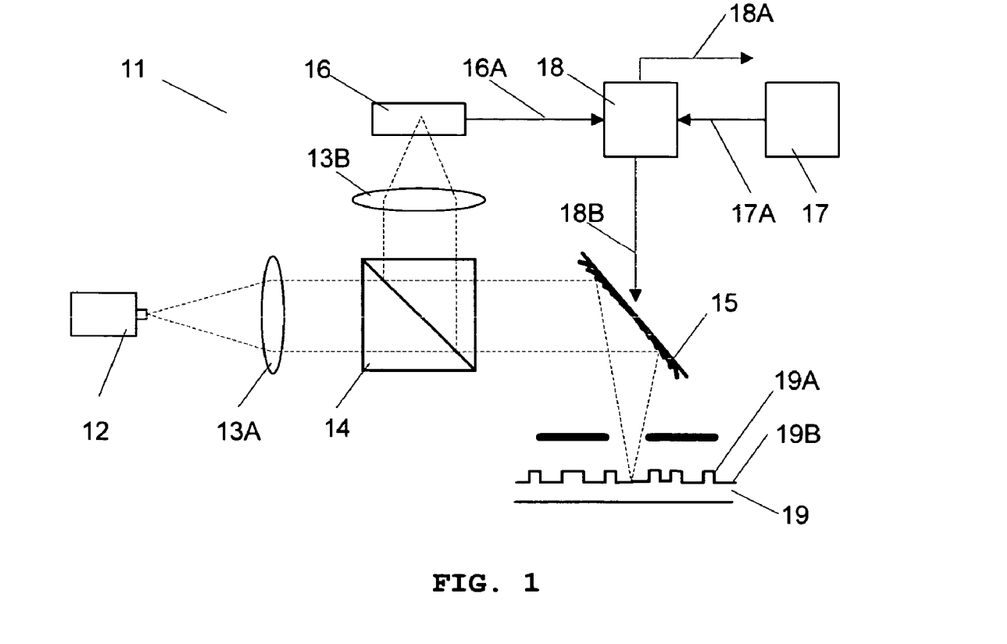
FIG. 1 is a schematic view of an optical pick-up device for a DVD recording and reproducing system in accordance with the present invention.

While aspects of the present invention are applicable to a variety of optical pick-up devices, a representative example of an optical pick-up device 11 to which embodiments of the present invention are applied is shown in FIG. 1. As shown in FIG. 1, the optical pick-up device 11 for a DVD recording and reproducing system includes a laser diode 12, a first optical lens 13A, a beam splitter 14, a second optical lens 13B, a MMAL 15, a sensor 16, a tilt detector 17, and a signal processor 18. The foregoing components are preferably packaged as a single unit within the device. However, various components of the device, such as the signal processor, may be remote or detachable from the device. The first and second optical lenses 13A and 13B are preferably conventional refractive lenses having fixed focal lengths. The MMAL 15 is a variable focal length lens. Such a MMAL is disclosed in U.S. Pat. Nos. 6,970,284, 6,934,072, and 6,934,073 and U.S. patent application Ser. No. 10/855,715 (filed May 27, 2004), Ser. No. 10/857,280 (filed May 28, 2004), Ser. No. 10/857,714 (filed May 28, 2004), U.S. patent application Ser. No. 10/983,353 (filed Nov. 8, 2004), U.S. patent application Ser. No. 11/076,616 (filed Mar. 10, 2005) and U.S. patent application Ser. No. 11/191,886 (filed Jul. 28, 2005), the entire disclosures of which are incorporated herein by reference. The sensor 16 comprises a photo detector, which may be a coupled charge device (CCD), a CMOS image sensor, or any other suitable alternative. In other embodiments, the sensor may comprise one or more photo detectors for detecting focus error and tracking error signals.

FIG. 1 illustrates how optical pick-up devices of the present invention read data from an optical disc 19. The laser diode 12 emits a laser beam which is passed through the first optical lens 13A. The first optical lens collimates the light beam. The light beam is then passed to the beam splitter 14. The light is passed from the beam splitter to the MMAL 15. The MMAL deflects the light beam substantially 90°, and focuses the light on a tracking location on a data layer of the optical disc 19. Light reflected from a reflective layer of the optical disc is collimated by the MMAL 15, and deflected back towards the beam splitter 14. The beam splitter then deflects the reflected light substantially 90°, towards the second optical lens 13B. The second optical lens passes the reflected light and focuses it on the sensor 16. The sensor detects the intensity of the reflected light from the reflective layer of the optical disc, and generates an electrical signal 16A based on the intensity of light it receives. In that regard, the reflected light is more diffused, or has a weak intensity when it hits a pit 19A in the data layer. The reflected light has a strong intensity when it strikes the smooth area, or land 19B, in between the pits. The data signal is generated by pits and land. The electrical signal is passed to the signal processor 18, which uses an algorithm to analyze the data signal from the sensor 16. One of well-known conventional signal processing algorithms can be used depending on the application. The signal processor generates a reproduction of RF signal 18A as well as control data 18B which is sent to the MMAL to adjust the micromirrors to compensate for focusing error, tracking error, and tilt error.

Similarly, optical pick-up devices of the present invention are capable of writing data onto the optical disc 19. In that regard, the intensity of the laser beam emitted by the laser diode 12 is varied according to a data signal transmitted to the laser diode via a data storage device (not shown) within the DVD recording and reproducing system. The laser beam is passed through the first optical lens 13A. The first optical lens collimates the light beam. The light beam is then passed to the beam splitter 14. The light is passed from the beam splitter to the MMAL 15. The MMAL deflects the light beam substantially 90°, and focuses the light on the dye layer of the optical disc 19. Depending on the intensity of the laser beam, the dye used to form the optical disc reacts to the heat and light to create a series of recorded pits and lands corresponding to the stored data.

In the typical optical pick-up device, a magnetically driven conventional lens has both focusing and tracking motions to record information on an optical disc or to read the recorded information from the optical disc. In a more advanced device, a conventional lens is macroscopically moved along one or more directions to compensate for the optical tilt, which results in coma aberration. However, in optical pick-up devices of the present invention, the MMAL 15 can cover the focusing, tracking, tilt compensation, and other operations of a conventional lens with minimal macroscopic motions. Macroscopic motion is only needed for the tracking operation of the device using the MMAL. This is possible because the MMAL is a variable focal length lens, capable of changing optical axis and compensating for aberrations by the microscopic three-degree-of-freedom motions of each micromirror. By replacing the magnetically driven conventional lens with a MMAL, a much simpler configuration can be achieved by reducing the number of moving parts.

Figure 2:
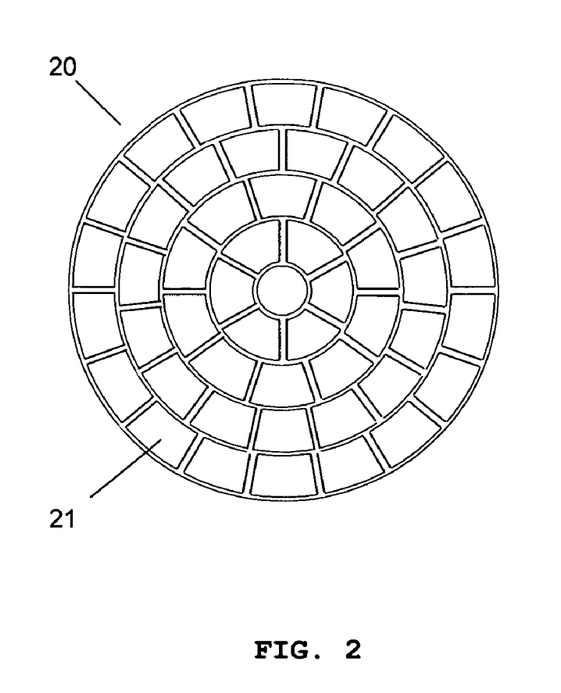
FIG. 2 is a top schematic view of a Micromirror Array Lens (MMAL) in accordance with the present invention.

As shown in FIG. 2, the MMAL comprises a plurality of micromirrors 21. The shape and arrangement of each micromirror may be varied according to the shapes and the objectives of the MMAL. The micromirrors 21 have the same function as a mirror and comprise a reflective surface made of metal, metal compound, or other materials with high reflectivity. Many known microfabrication processes may be used to make the surface have high reflectivity.

Each micromirror 21 is electrostatically and/or electromagnetically controlled by actuating components that rotate and translate the micromirror. The micromirrors are controlled to change the focal length of a MMAL 20 by controlling their translational and/or rotational motions. The mechanical structures upholding the micromirrors 21 and the actuating components that rotate and translate the micromirrors are located under the micromirrors to enable the micromirrors to be positioned closer to one another. The close positioning of the micromirrors increases the effective reflective area of the MMAL.

Figure 3:
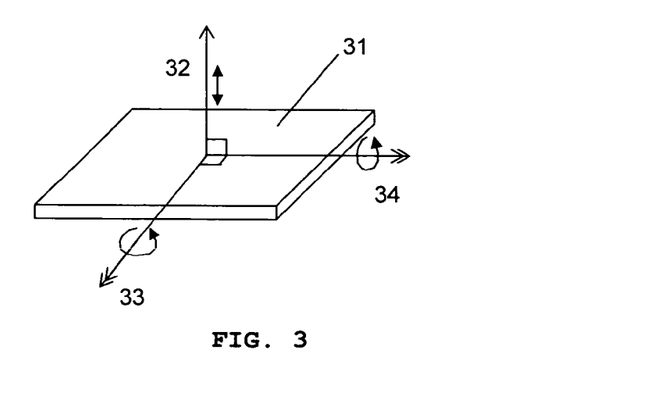
FIG. 3 is a perspective view displaying the degrees-of-freedom of a micromirror in accordance with the present invention.

As shown in FIG. 3, each micromirror 31 has three degrees-of-freedom motion, one translational motion 32 along the normal axis to the plane of each MMAL, and two rotational motions 33 and 34 about two axes in the plane of each MMAL. The translational motion is required to meet a phase matching condition to compensate for aberrations. The two rotational motions are required to deflect light in an arbitrary direction and are essential for versatility of the array of MMALs.

Figure 4A:
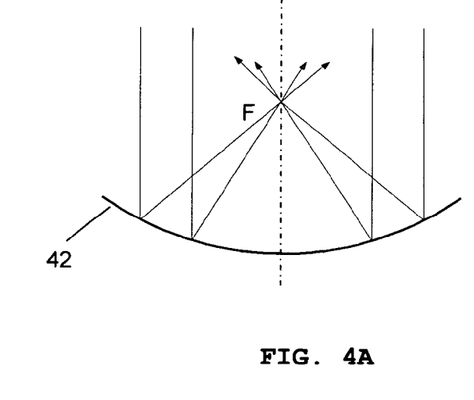
FIGS. 4A and 4B are schematic side views illustrating the analogy between a concave mirror and a MMAL (Frensel reflective lens)
Figure 4B:
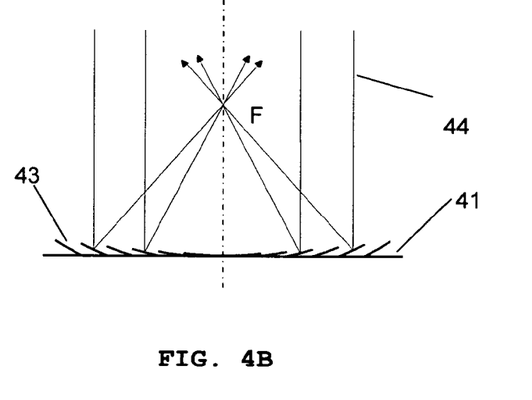

FIGS. 4A and B illustrate the principle of a MMAL and the analogy between a MMAL 41 and a conventional concave mirror 42. It is well known that a concave mirror functions as a convex refractive lens. The MMAL is effectively a type of reflective Frensel lens. As shown in FIG. 4(b), a MMAL comprises a plurality of micromirrors 43. Unlike the conventional concave mirror, the MMAL can change its focal length by controlling the rotational and/or translational motion of micromirrors.

In that regard, the MMAL converges arbitrarily scattered light 44 onto a focal point F by controlling the position of the micromirrors 43. The phases of the arbitrary beams of light may be adjusted to be the same by translating each one of the micromirrors. The required translational displacement range of the micromirrors is at least half of the wavelength of light. The focal length F of the MMAL 41 is changed by controlling the rotational and/or translational motion of each micromirror.

Therefore, by controlling each micromirror independently, the lens can correct defect and aberration which are caused by various optical effects such as optical tilt, mechanical deflection, and so on. The micromirrors can correct the phase error of light scattered from the optical disc to remove phase aberration by controlling the amounts of their translations and rotations. The lens also has a high optical focusing efficiency and can have a large size aperture without losing optical performance. The lens has low production cost because of the advantage of its mass productivity that can be achieved by typical microfabrication methods. The lens can also make the focusing system much simpler due to its simple structure.

Figure 5A:
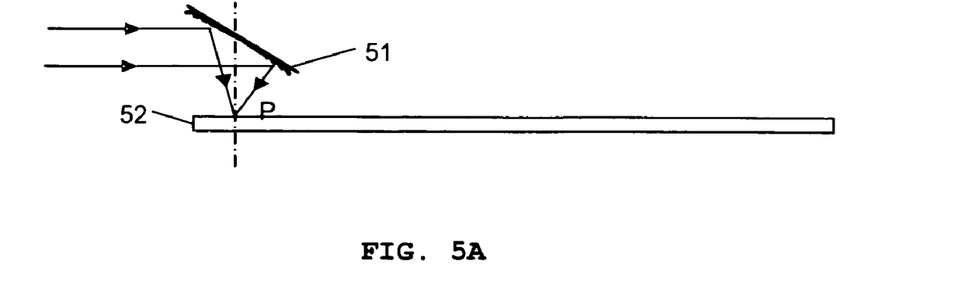
FIGS. 5A and 5B are schematic side views illustrating how MMALs of the present invention compensate for tilt of the optical disc.
Figure 5B:
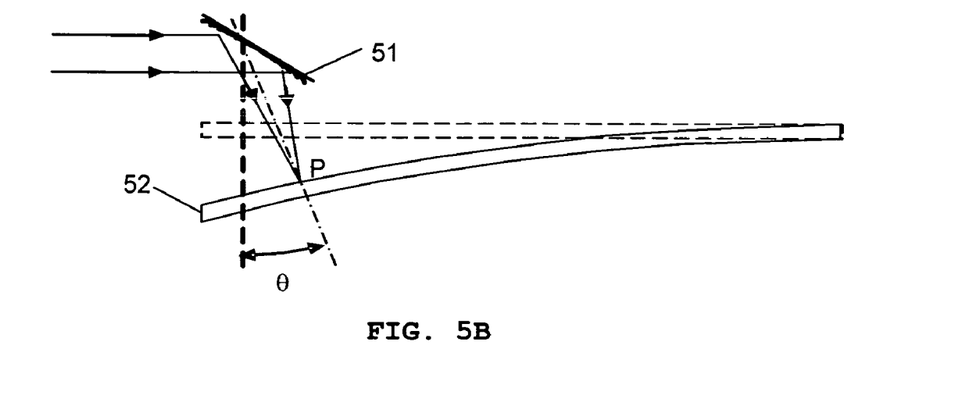

When an optical disc is tilted in an optical disc drive, the quality of a recorded signal and/or a reproduced signal of the optical disc may be lowered. In order to correct the tilt of the optical disc, the optical pick-up device may comprise a tilt detector 17, as shown in FIG. 1. The tilt detector detects the tilt of the optical disc and generates a tilt signal 17A in response to the detected tilt. The tilt signal is transmitted to the signal processor 18. The signal processor processes the tilt signal and transmits a control signal 18B to the MMAL to compensate for the tilt error. FIGS. 5A and 5B illustrate how the MMAL 51 compensates for tilt and deflection of the optical disc 52 when in use. When a tilt and/or mechanical deflection of an optical disc 52 occur, the MMAL 51 maintains the focus at the point P on the optical disc by changing its focal length and optical axis. In addition, the MMAL 51 can also correct various aberrations because the lens is an adaptive optical lens. Thus, with no macroscopic motions, the lens can compensate for a focusing error, a tracking error, and aberration caused by tilt and/or mechanical deflection.

Figure 6:
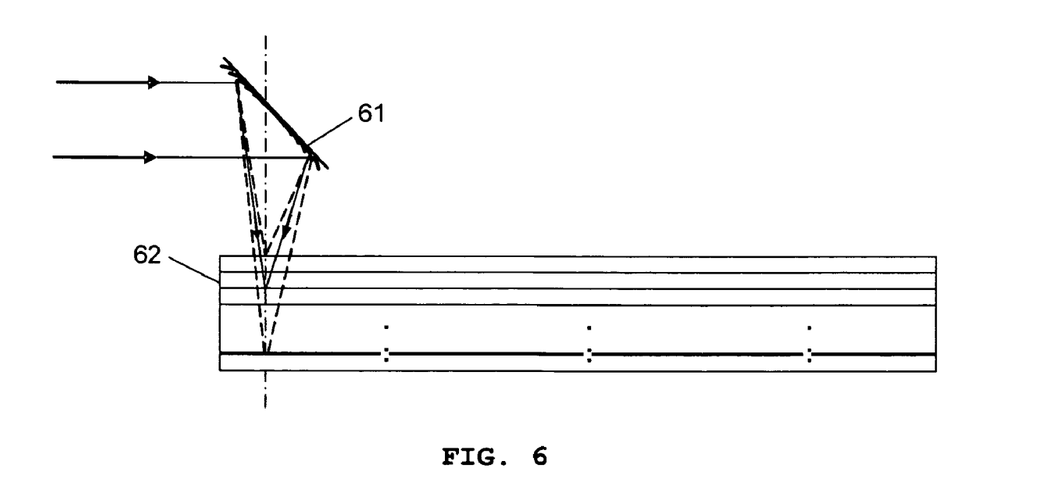
FIG. 6 is a schematic side view illustrating how MMALs of the present invention record data on or read data from a multi-layered optical disk.

As shown in FIG. 6, MMALs 61 of the present invention are capable of recording data on and reading data from a multi-layered optical disc 62. In this instance, the MMAL records and/or reads information at each layer of a multi-layered optical disc by changing its focal length to focus on the desired layer. Since the response time of MMAL is very fast, so is the transition time from one layer to another.

Figure 7:
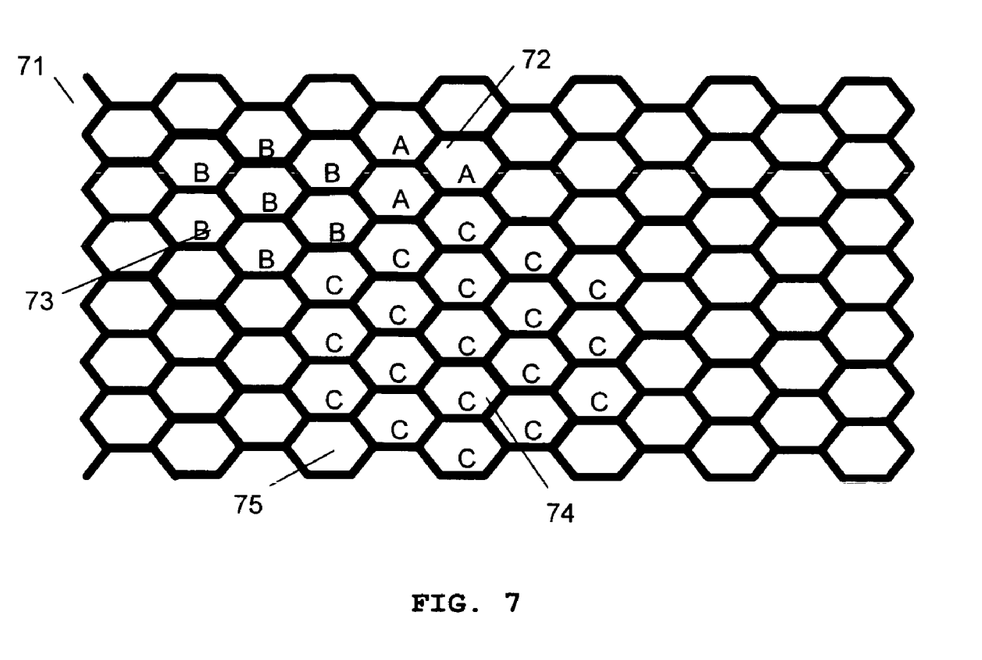
FIG. 7 a schematic top view of an array of MMALs in accordance with the present invention.
Figure 8:
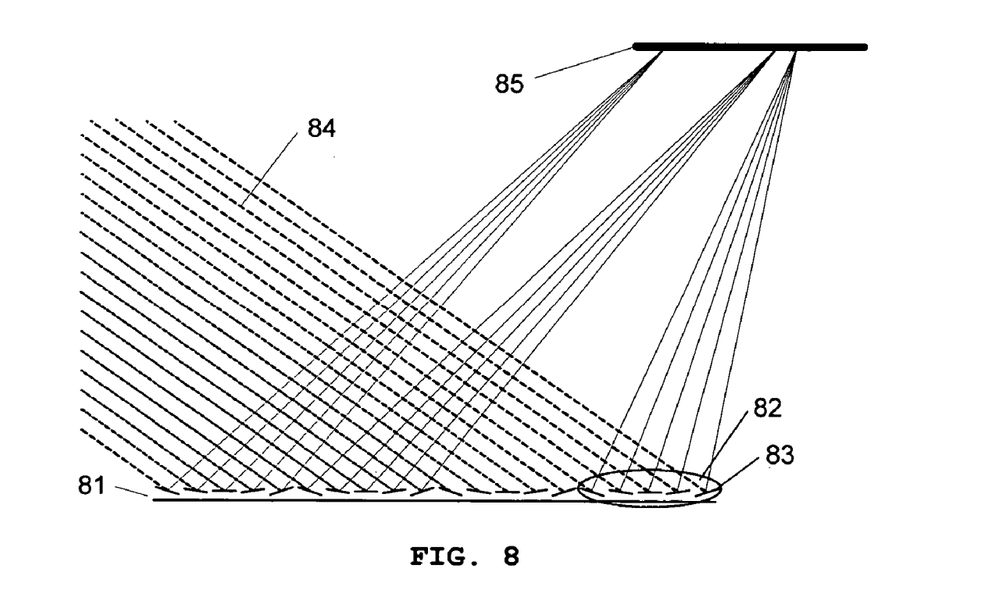
FIG. 8 is a schematic side view of portion of an optical pick-up device for a DVD recording and reproducing system comprising an array of MMALs.

In other embodiments of the present invention, as shown in FIGS. 7 and 8, the optical pick-up device may comprise a planar array 71 (81 in FIG. 8) of MMALs 72, 73, 74 with different shapes, sizes, and numbers of micromirrors 75. Such an array of MMALs is disclosed in U.S. patent application Ser. No. 10/857,714 (filed May 28, 2004), the optical disclosure of which is hereby incorporated by reference as if set forth in full herein.

Accordingly, the position of each MMAL is not fixed in the plane and many different MMALs 72, 73, 74 can be "created" and "deleted". In addition to all the optical parameters such as the focal length, the optical axis, the lens size, the number of micromirrors, and others of each MMAL, the total number of lenses comprising the array is variable according to the purpose of the array.

The MMALs are not limited to the configuration shown in FIG. 7. The micromirrors can have arbitrary shapes and sizes, and form a lens with arbitrary shape and size or an array of MMALs. Even though only the hexagonal shape is shown in FIG. 7, the micromirrors can have different shapes to form different types of lens arrays without losing their effective reflective area. In order to increase the effective reflective area, the control circuitry of the lens can be constructed by known microelectronics technology, which is located under the mirrors.

As shown in FIG. 8, each MMAL 82 can have a different optical axis, a different number of micromirrors 83, and a different focal length. Since each MMAL 82 also can freely change its optical axis and focal length with three-degree-of-freedom motions of its micromirrors, each MMAL causes incident light 84 to focus at any position in a plane 85 or scan the whole plane.

Figure 9:
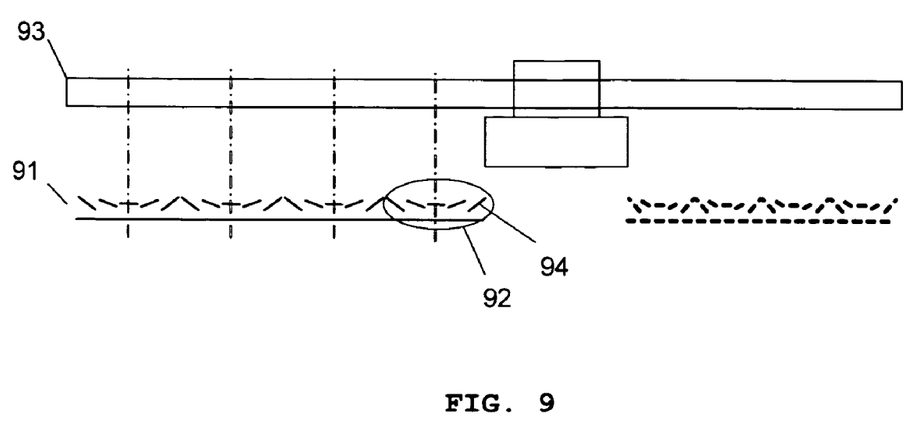
FIG. 9 is a schematic side view of a high-speed optical pick-up device for a DVD recording and reproducing system having an array of MMALS.

FIG. 9 shows a high-speed optical pick-up device of the present invention with a planar array 91 of MMALs 92. As mentioned above, the MMAL can cover the focusing, tracking, layer jumping, tilt compensating, and other operational motions of a conventional optical pick-up device. In this embodiment, macroscopic motion is only needed for the tracking operation of the device using the MMAL. However, if the array 91 is set to cover the whole radial region of an optical disc 93, even the tracking operation will be covered and then there will be no macroscopic motions in the optical pick-up device for the DVD recording and reproducing system. Since each lens of the lens array can change its focal length and optical axis very fast by controlling each of their micromirrors 94, each lens is only required to scan its assigned region of the optical disc without any macroscopic motion and is much faster than a MMAL with tracking operations. In addition, the system can be sped up as more lenses 92 are added to the array in the radial direction.

Thus, if an array of MMALs is applied to the system, all macroscopic motions including tracking motion are no longer needed and an optical pick-up device becomes motorless. The DVD recording and reproducing system can improve its reliability and reading/writing speed with a high optical focusing efficiency by removing motor parts in the optical pick-up device.

At present, there exist many kinds of optical information recording media, and the standards of these optical information recording media are established. Because the optical information recording media have different recording densities, compatibility between CD and DVD is required. These optical information recording media have different thicknesses of the transparent base board. In order to obtain the interchangeability, it is necessary to correct a spherical aberration generated by the difference of the thickness of the transparent base boards. The spherical aberration can be compensated by controlling the rotations and/or translations of micromirrors.

The preceding description has been presented with reference to presently preferred embodiments of the invention. Workers skilled in the art and technology to which this invention pertains will appreciate that alterations and changes in the described structure may be practiced without meaningfully departing from the principal, the spirit, and the scope of the invention.

Accordingly, the foregoing description should not be read as pertaining only to the precise structures described and illustrated in the accompanying drawings, but rather should be read consistent with and as support to the following claims, which are to have their fullest and fair scope.

What is claimed is:

1. An optical pick-up device for DVD recording and reproducing systems comprising at least one micromirror array lens (MMAL), wherein the MMAL comprises a plurality of micromirrors with two rotational and one translational degrees-of-freedom motion, wherein the two rotational motion is controlled to deflect light to a focal point and one translational motion is controlled to meet phase matching condition and to correct phase error of the light and wherein the motions of the micromirrors in the MMAL are adjustable to vary the focal length of the MMAL.

2. The optical pick-up device of claim 1, wherein the MMAL is used for focusing a light on the optical disc.

3. The optical pick-up device of claim 2, wherein the optical axis of the MMAL is changed.

4. The optical pick-up device of claim 3, wherein the MMAL is used for tracking operations of the optical disc.

5. The optical pick-up device of claim 2, wherein the MMAL is used to compensate for the tilt of the optical disk.

6. The optical pick-up device of claim 2, wherein the MMAL records information on each layer of a multi-layered optical disc by changing its focal length.

7. The optical pick-up device of claim 2, wherein the MMAL reads information from each layer of a multi-layered optical disc by changing its focal length, thereby providing seamless layer jumping.

8. The optical pick-up device of claim 2, wherein the MMAL compensates for the spherical aberration generated by the varying thickness of different recording media, thereby enabling the optical pick-up device to be used interchangeably between CD and DVD.

9. The optical pick-up device of claim 2, further comprising:
    a laser diode, wherein the laser diode generates a light beam that is passed through a conventional lens that collimates the light;
    a beam splitter, wherein the beam splitter passes the collimated light to the MMAL, and wherein the MMAL deflects the light and focuses the light on a tracking location along the optical disc;
    a photo detector for detecting light reflected from the surface of the optical disc, wherein the photo detector generates an electrical signal based on the intensity of the reflected light; the electrical signal corresponding to the information recorded on the optical storage media; and
    a signal processor that processes the data and generates a control signal, wherein the control signal is transmitted to the MMAL to adjust the relative positions of the micromirrors.

10. The optical pick-up device of claim 9 further comprising a tilt detector that measures tilt of the optical disc, wherein the measured tilt data is transmitted to the signal processor, and the signal processor generates a control signal that is transmitted to the MMAL to adjust the micromirrors according to the measured tilt.

11. An optical pick-up device for a DVD recording and reproducing system comprising an array of MMALs, wherein the MMALs comprise a plurality of micromirrors with two rotational and one translational degrees-of-freedom motion, wherein the two rotational motion is controlled to deflect light to a focal point and one translational motion is controlled to meet phase matching condition and to correct phase error of the light and wherein the motions of the micromirrors in the MMAL are adjustable to vary the focal length of the each MMAL.

12. The optical pick-up device of claim 11, wherein the focal length of each MMAL is changed independently.

13. The optical pick-up device of claim 11, wherein the optical axis of each MMAL is individually changed.

14. The optical pick-up device of claim 13, wherein the scanning operation of each MMAL plays the role of tracking, thereby eliminating macroscopic tracking motion and enabling a motorless optical pick-up device.

* * * * *